E. R. ARMSTRONG.
POWER DELIVERING ATTACHMENT FOR MOTOR VEHICLES.
APPLICATION FILED MAY 15, 1915.
1,223,465.
Patented Apr. 24, 1917.
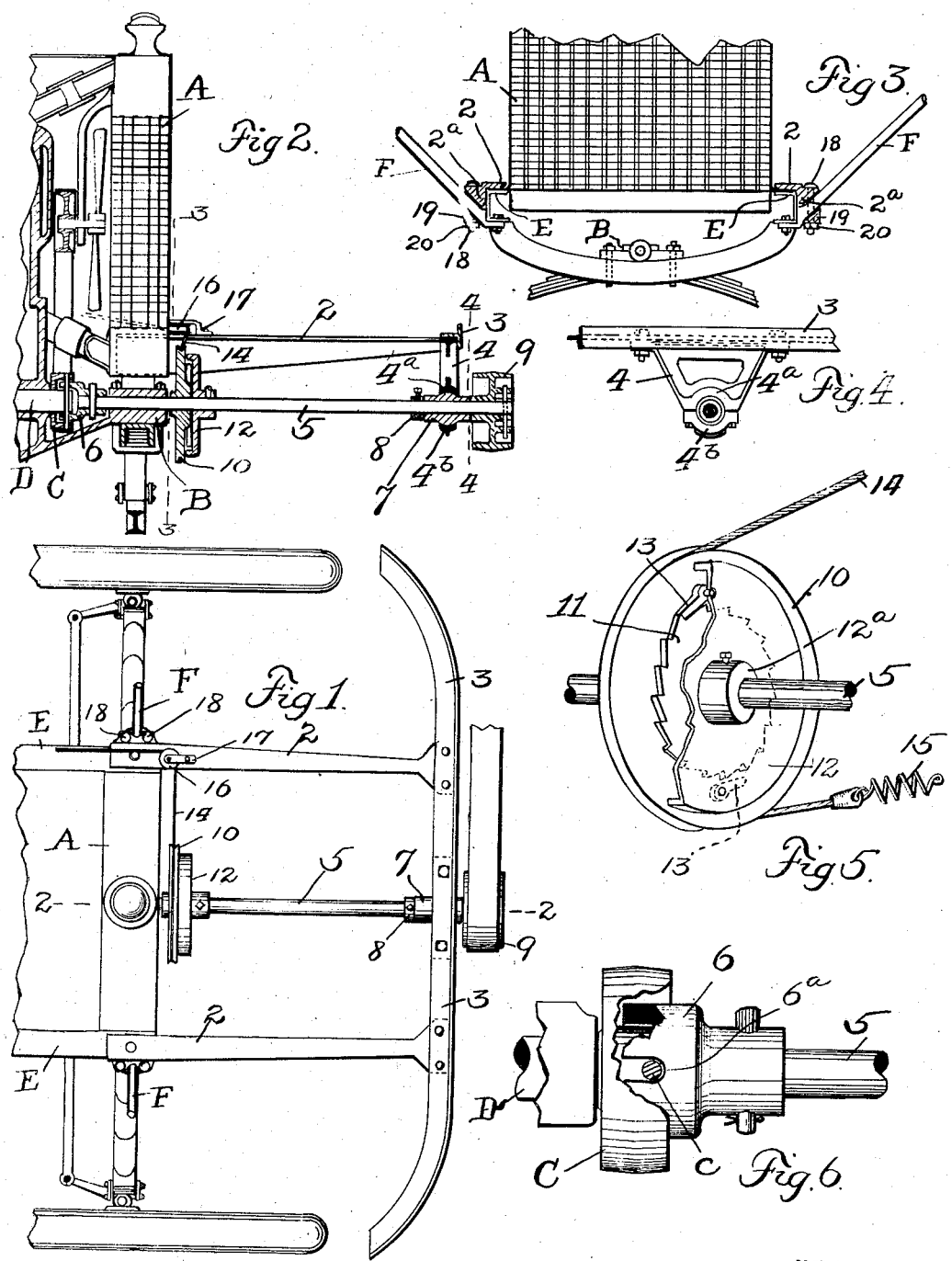

UNITED STATES PATENT OFFICE.

EDWIN ROYCE ARMSTRONG, OF EVANSTON, ILLINOIS, ASSIGNOR TO AUTO POWER COMPANY, OF OMAHA, NEBRASKA, A CORPORATION OF NEBRASKA.

POWER-DELIVERING ATTACHMENT FOR MOTOR-VEHICLES.

1,223,465.   Specification of Letters Patent.   Patented Apr. 24, 1917.

Application filed May 15, 1915. Serial No. 28,284.

*To all whom it may concern:*

Be it known that I, EDWIN ROYCE ARMSTRONG, a citizen of the United States, residing at Evanston, county of Cook, and State of Illinois, have invented certain new and useful Improvements in Power-Delivering Attachments for Motor-Vehicles, of which the following is a specification.

The object of the present invention is to provide a ready and efficient means, in the nature of an attachment, for taking power from the engine of a motor vehicle and delivering or distributing it for any one of a multitude of utilitarian purposes, as for example the operation of farm machinery. Thus the motor vehicle may be extensively utilized as a portable power plant and the value of the investment very greatly increased. In this connection it may be mentioned that the engine of a motor vehicle ordinarily outlasts the vehicle itself considered as a means of transportation, though it might continue to serve perfectly well for purposes of a portable power plant.

I am aware that it is not entirely novel to take power from the engine of a motor vehicle for purposes other than that of driving the vehicle. But there are certain desiderata which it is the aim of my present invention to better satisfy than any of the previous attachments or appliances with which I am familiar.

For one thing I provide a certain degree of flexibility or latitude for self-adjustment, in the bearings, of the engine shaft extension which carries the power delivering element, such as a pulley, sprocket wheel or the like. Thereby misalinement may be compensated for, as well as varying conditions as to framework and attachments used to sustain the shaft extension, and satisfactory transmission of power will be unimpaired by any such conditions. Then too the parts of the attachment need not be so accurately and uniformly turned out as would otherwise be the case, and this of course economizes in production.

Another matter which is considered important, more especially in connection with the application of a power delivering appliance to a pleasure vehicle, is that of appearance. My invention provides for applying an attachment to a pleasure vehicle in such manner as in no way to detract from its appearance. Thus I provide for an extension of the engine shaft at the front of the vehicle and for supporting the extension in a frame whose forward cross-bar constitutes a bumper occupying such a position as bumpers ordinarily occupy upon motor vehicles.

Another matter to be considered is the desirability of requiring no alteration in the structure of the vehicle itself or in the engine or the suspension of the engine, and furthermore to preserve starting facilities. In this connections I provide for applying my power delivering attachment by utilizing the bearing already present for the shaft of the starting crank, and clutching the extension shaft of my attachment, to the engine shaft, utilizing the clutch element which the latter ordinarily carries for coöperating with the starting crank. Then on the outer end of the extension shaft I provided a similar clutch element, so that the starting crank may be applied there with the same effect as when applied to the clutch element on the engine shaft. Or I may apply a mechanical starter to the extension shaft to be operated from the interior of the vehicle.

In the drawings which accompany and form part of this specification, I have illustrated my attachment as applied to the well-known Ford automobile. Figure 1 represents the front portion of a Ford car in plan view with my power delivering attachment applied thereto; Fig. 2 is a vertical front-to-rear section taken substantially on the line 2—2 of Fig. 1; Fig. 3 is a sectional front elevation taken substantially on the line 3—3 of Fig. 2; Fig. 4 is a somewhat similar view taken on the line 4—4 of Fig. 2; Fig. 5 illustrates in perspective, partly broken away, a mechanical starting device; Fig. 6 is a detail sectional elevation of the combined pulley and clutch element on the engine shaft together with the coacting clutch element on the extension shaft, these parts being shown on an enlarged scale.

Referring first to Fig. 1 the reference numeral 2 represents a pair of angle irons which are designed to extend directly forward from the base of the radiator A of the car, and the reference numeral 3 designates a T-bar extending across the front ends of the bars 2 and having its horizontal flange riveted to widened portions of said bars 2. This T-bar is extended beyond the angle bars 2 and has its end portions curved so as to constitute a bumper of such a character as commonly employed in motor vehicles to protect the front tires and the radiator and other parts from injury through collisions.

To the under side of the horizontal flange of said T-bar at about its middle, I apply a bracket 4. This is preferably also of T-bar construction. Its upper horizontal flange is riveted or bolted to the horizontal flange of the T-bar 3, and this bracket at its lower central portion supports a bearing for the extension shaft of my attachment. This shaft is designated 5 and is designed at its rear portion to occupy the bearing B commonly occupied by the starting crank of the car. A clutch element in the form of a notched collar 6 is secured to the inner end of said shaft and interlocks with the familiar clutch element C which is carried on the front end of the engine shaft D. Said element appears in the form of a pulley by which the radiator fan is driven.

The forward bearing for said extension shaft 5 is in the form of a sleeve 7 whose central portion is of ball formation, and adjustably held in a socket or clamp on the bracket 4. This clamp comprises two semicircular halves 4ª and 4ᵇ with cupped interior surfaces to embrace the ball of the sleeve. The under half 4ᵇ is bolted or riveted to the upper half 4ª which is integral with the bracket 4. The sleeve 7 is confined between a collar 8 fastened to the shaft 5, and a pulley 9 keyed to the shaft where it extends beyond the sleeve. This pulley is the power delivering element.

It will be noted that both by reason of the ball and socket support for the outer bearing of the extension shaft, and by reason of lateral looseness of the interlock between the clutch element C and the notched collar 6 (play between cross-pin C and notches 6ª), the shaft mounting is endowed with a degree of flexibility in all directions. This is of very great importance in connection with delivery of power without undue strain or imperfect transmission due to misalinement of the engine shaft, or roughness of manufacture of attachment parts. With the clamp 4ª—4ᵇ loosened, the bearing sleeve 7, may adjust itself universally to accommodate shaft alinement.

The pulley 9 is here shown formed as a clutch element to which the familiar starting crank may be applied, its formation at the outer middle portion corresponding with that of the regular clutch element C. The extension shaft 5 may, however, be utilized in connection with a mechanical starter such as that illustrated in the drawings. Thus a pulley 10 is mounted loosely upon the shaft and has secured to it, or formed integral with it, a ratchet wheel 11. A disk 12 is fastened by its hub 12ª to the shaft and is preferably flanged to embrace said ratchet wheel, and this disk carries gravity pawls 13 to be engaged by said ratchet. A cord or band 14 engages the groove of the pulley 10 and is attached at one end to a stout spring 15. The other end of the cord or band is carried into the interior of the vehicle. It is conveniently run over a sheave 16 carried in a bracket 17 secured to one of the forwardly extending angle bars 2 of my attachment. The operation of this mechanical starting device will be obvious, and as it is of familiar construction, *per se*, further description would seem to be unnecessary.

The angle bars 2 of the attachment are adapted to fit over similar bars E of the radiator support or base, extending sufficiently thereover to give lateral and vertical stability to the attachment in connection with suitable clamps. A convenient way of holding these bars in place is to apply clamps around the fender irons F which run from the base of the radiator out over the front wheels. In the present instance I show said bars 2 formed with clamping lugs 2ª, which receive bolts 18 extending on opposite sides of the fender iron and through a yoke 19 below said iron, nuts 20 being applied to said bolts.

It will now be seen that the above described construction is well calculated to thoroughly fulfil the object primarily stated. However, it is to be understood that modification may be practised, having regard especially to the many different types of motor vehicles, and therefore I do not confine myself in the appended claims to the precise form of attachment here shown. Obviously the frame of the attachment need not necessarily be attached directly to the chassis, nor need said frame be of the particular form shown.

I claim:

1. In combination with the engine shaft of a motor vehicle and the chassis, of an auxiliary shaft, a clutch connecting the same and the engine shaft with provision for relative lateral play, a frame attached to and extended from the chassis, and a bearing for the auxiliary shaft movable in the outer portion of said frame.

2. In combination with the chassis of a motor vehicle, and the engine shaft thereof extending lengthwise said chassis, of a frame attached to the latter and projecting forwardly therefrom, an auxiliary shaft in bearings on the chassis and the outer part of said frame and alined with the engine shaft and carrying at its forward end a power-delivering element such as a pulley, and a clutch connecting the said auxiliary shaft to the end of the engine shaft opposite that from which the vehicle is propelled.

3. In combination with the chassis of a motor vehicle and the engine shaft thereof extending lengthwise said chassis, of a frame attached to the latter and projecting forwardly therefrom and comprising substantially parallel side bars, and an outer transverse bar extending beyond said side bars constituting a bumper, and an auxiliary shaft in bearings on the chassis and said transverse bars of the frame and alined with and clutched to the engine shaft and carrying at its forward end a power-delivering element such as a pulley.

4. In combination with the chassis of a motor vehicle and the engine shaft thereof extending lengthwise said chassis, of a frame attached to the latter and projecting forwardly therefrom and comprising substantially parallel side bars, and an outer transverse bar extending beyond said side bars and constituting a bumper, a shaft-bearing depending from the latter, and an auxiliary shaft in said bearing and alined with and clutched to the engine shaft and carrying at its forward end a power-delivering element such as a pulley.

5. In combination with the chassis of a motor vehicle and the engine shaft thereof extending lengthwise said chassis, of a frame attached to the latter and projecting forwardly therefrom and having a transverse member constituting a bumper, a bracket depending from the latter and having a ball-socket, a shaft bearing with a ball engaging said socket, and an auxiliary shaft in bearings on the chassis and said frame and alined with and clutched to the engine shaft and carrying at its forward end a power-delivering element such as a pulley.

EDWIN ROYCE ARMSTRONG.

Witnesses:
FRANK PARKER DAVIS,
ROBERT DOBBERMAN.